Nov. 19, 1968   C. B. HINDMAN ET AL   3,411,541
DUAL CONTROL VALVE

Filed Feb. 28, 1966                                   5 Sheets-Sheet 1

INVENTORS.
Clarence B. Hindman
James P. Junkins

THEIR ATTORNEYS

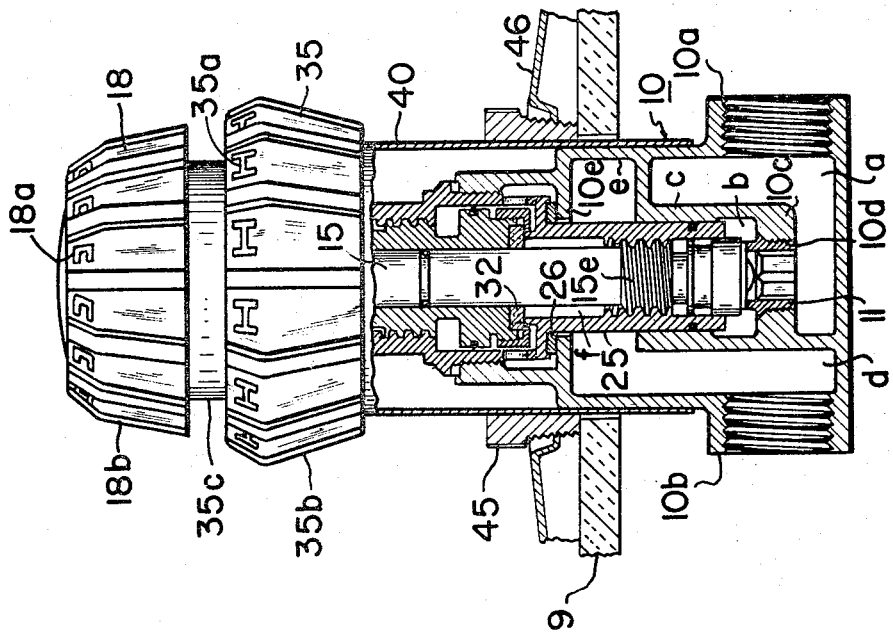
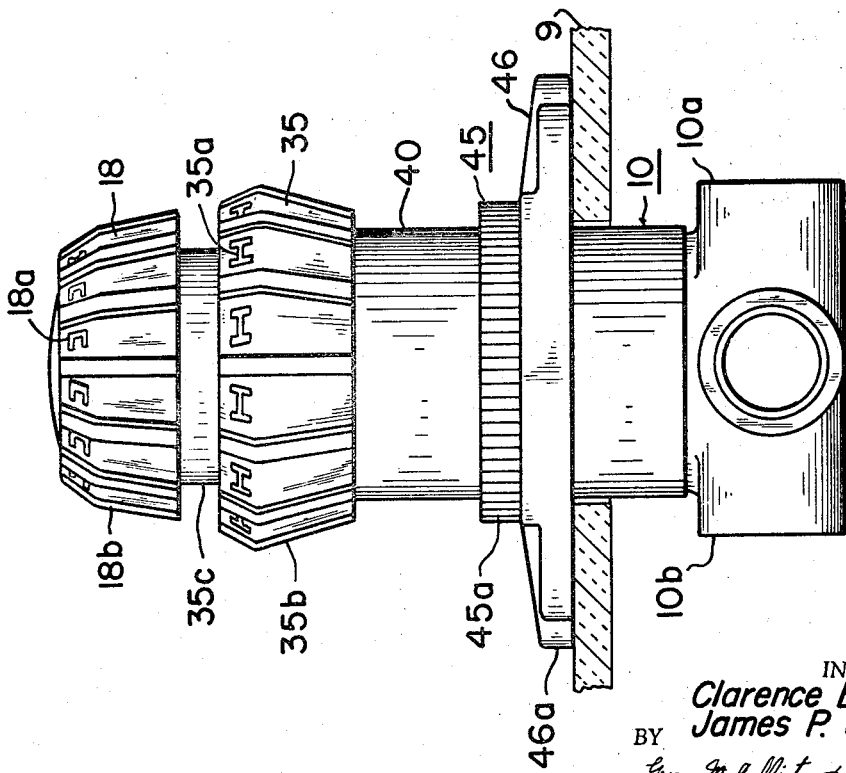

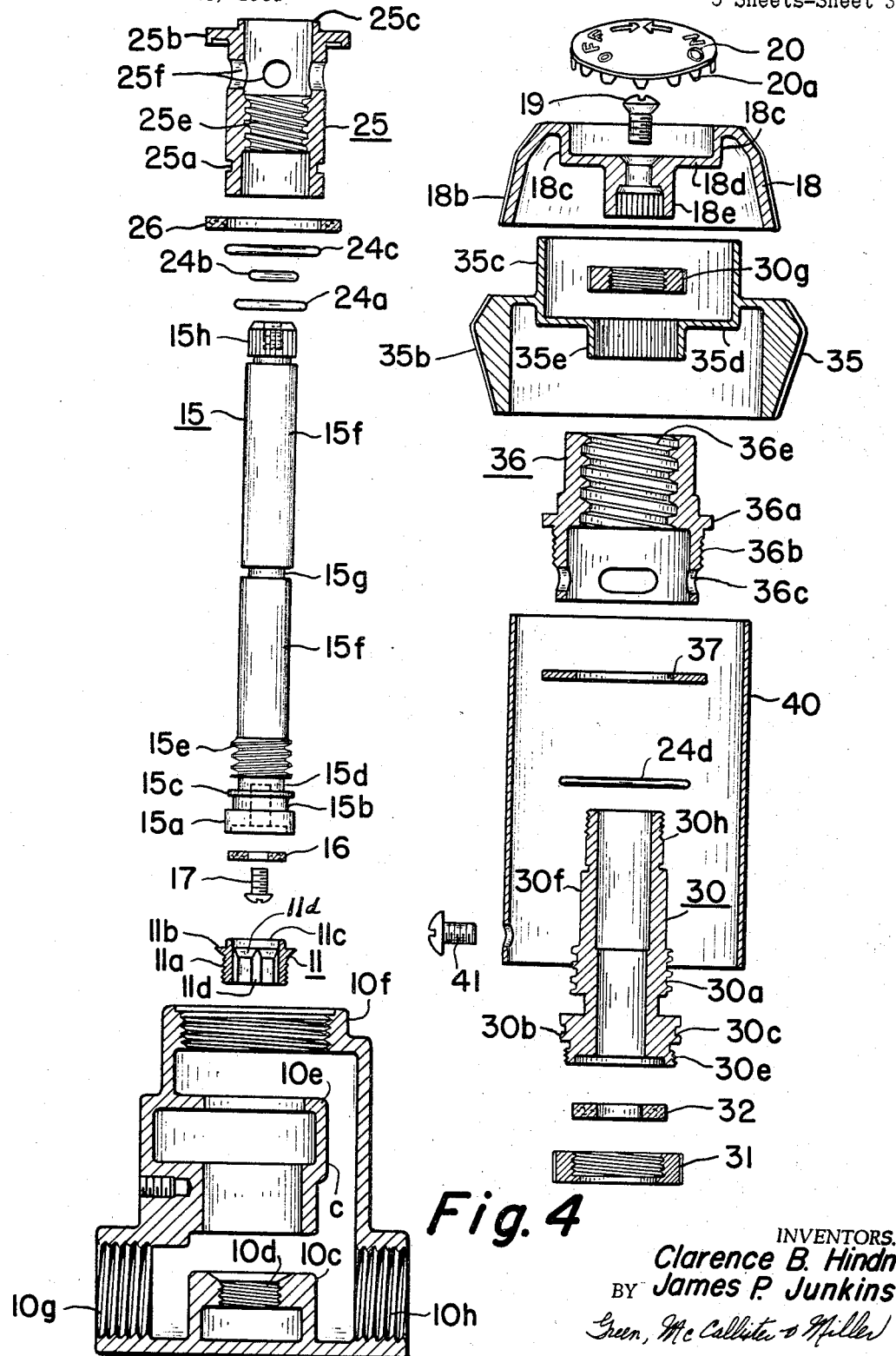

INVENTOR.
Clarence B. Hindman
BY James P. Junkins
THEIR ATTORNEYS

Nov. 19, 1968   C. B. HINDMAN ET AL   3,411,541
DUAL CONTROL VALVE
Filed Feb. 28, 1966   5 Sheets-Sheet 5

INVENTORS.
Clarence B. Hindman
BY James P. Junkins

THEIR ATTORNEYS

United States Patent Office 3,411,541
Patented Nov. 19, 1968

3,411,541
DUAL CONTROL VALVE
Clarence B. Hindman and James P. Junkins, Morgantown, W. Va., assignors to Sterling Faucet Company, Morgantown, W. Va., a corporation of West Virginia
Filed Feb. 28, 1966, Ser. No. 530,312
6 Claims. (Cl. 137—637.2)

ABSTRACT OF THE DISCLOSURE

A unitized dual control valve device is provided for supplying hot, cold or a mixture of hot and cold fluids, such as water, to one or more outlets. The device has a pair of valve means operated by a pair of coaxial spindles, with an inner spindle positioning an outer spindle. Operating knobs are mounted in an axially adjacent relationship on the spindles in order that an operator may turn the knobs separately or simultaneously to control the temperature and amount of water flow. A housing defines a common fluid outlet chamber and two fluid inlet chambers to receive fluid from the two different sources; it carries bushings for rotatably-mounting the coaxial spindles. Groups of fluid inlets and outlets are provided along the spindles in a manner to simplify the construction, to provide a maximum of operative efficiency with a minimum of space requirements, and to enable two fluid inlet and two fluid outlet bosses to be positioning on the same transverse plane.

---

This invention relates to a control valve and particularly, to a unitized valve for controlling the flow of fluid of different characteristics or temperatures between a pair of sources and a common fluid outlet.

A phase of our invention pertains to a combined or unitized hot and cold water valve structure or device for supplying either fully cold, fully hot, or mixed hot and cold water to one or more outlets.

This invention has been developed to particularly meet the need for a dual type of valve structure or device having individual valve means for hot and cold water supply to a common outlet chamber, whose valve means may be operated separately or simultaneously and, in the latter case when desired, may be operated in the same sequence.

It has been an object of our invention to find a practical solution to the problem of providing a compact and efficient unitized valve structure, unit or device having valve means for more than one supply inlet which will enable each supply inlet to be individually opened, closed and controlled and, at the same time, which will enable both to be simultaneously opened, closed or controlled;

Another object of our invention has been to devise an improved valve structure for control of fluid flow from at least two sources which will be efficient in operation, will only require a single mounting opening or hole, and which will minimize space requirements and simplify its installation;

Another object of our invention has been to provide a dual valve device whose valve means may be effectively operated or controlled in an endwise-aligned or coaxial relation;

A further object of our invention has been to provide a coaxial type of dual valve device that may be employed for controlling fluid flow, such as the flow of hot and cold water, to a common outlet;

A still further object of our invention has been to provide a unitized valve device having a plurality of fluid control valve means that may be individually or simultaneously operated, as desired, and by the same hand or manual movement of the operator;

These and other objects of our invention will appear to those skilled in the art from the illustrated embodiment and the claims.

In the drawings,

FIGURE 2 is a vertical view on the actual scale of our device, taken at right angles to FIGURE 1;

FIGURE 3 is a sectional view in elevation on the scale of FIGURE 2, taken in the same direction as FIGURE 2 and in the direction of line III—III of FIGURE 6, and at right angles to FIGURE 1; in this figure, both valve means of the construction are also shown in fully closed-off positions;

FIGURE 4 is an exploded vertical view in partial section of our valve construction on the same scale as FIGURES 2 and 3, illustrating details of the parts, elements or members employed in making up the unit or device; this view is taken in the same direction as FIGURE 1;

Figure 1:
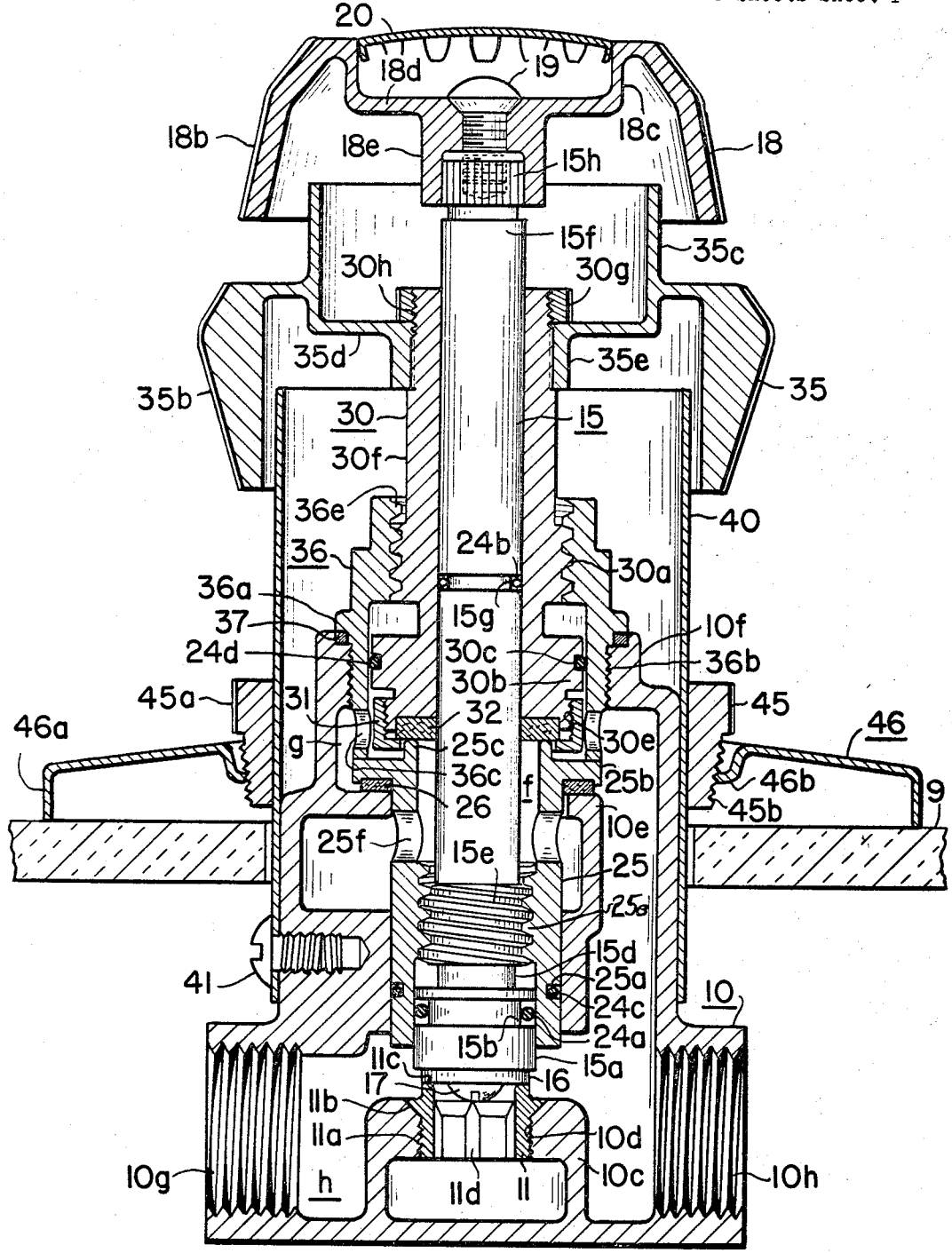
FIGURE 1 is a greatly enlarged vertical section in elevation of a valve construction or device of our invention, showing it in a mounted relation with respect to a building wall and with both of its valcve means in closed-off positions; this view is taken in the direction of line I—I of FIGURE 6.
Figure 5:
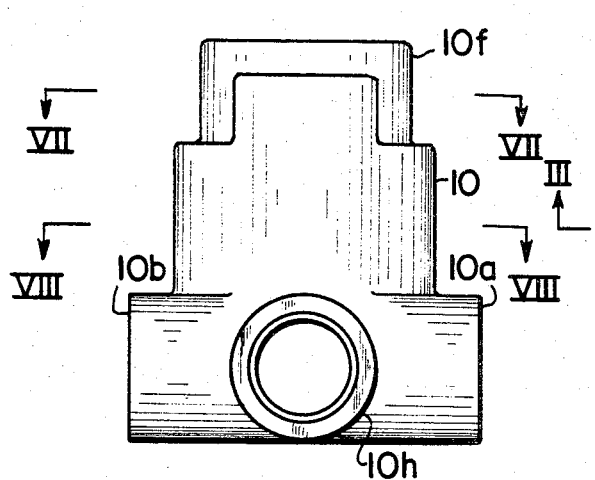
FIGURE 5 is a side view taken in the same direction and on the scale of FIGURE 2 of a main valve housing or casing part of the construction.
Figure 6:
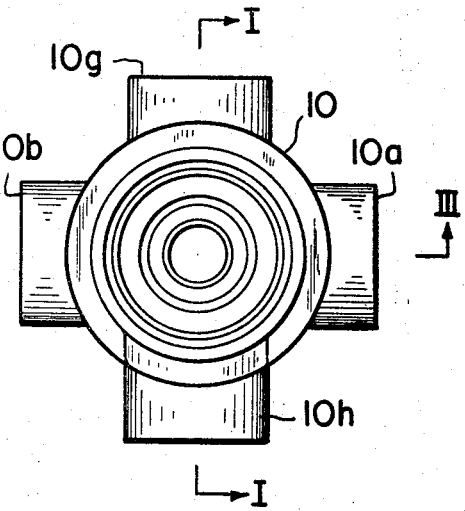
FIGURE 6 is a top plan view on the scale of FIGURE 5 and of the valve housing shown in such figure.
Figure 7:
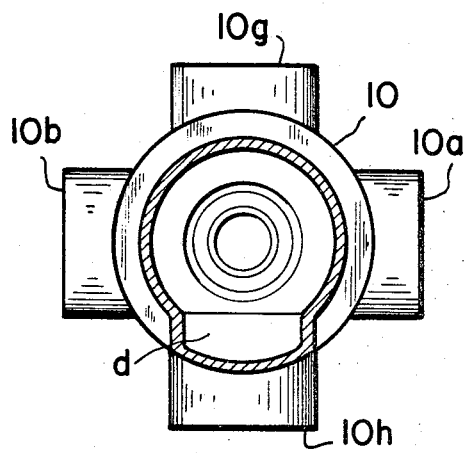
FIGURE 7 is a horizontal section on the scale of and taken along the line VII–VII of FIGURE 5.
Figure 8:
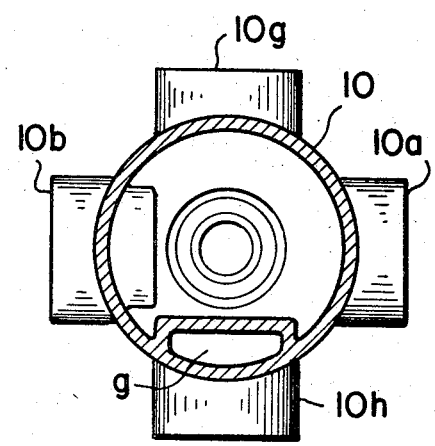
FIGURE 8 is a horizontal section on the scale of and taken along the line VIII–VIII of FIGURE 5.
Figure 9:
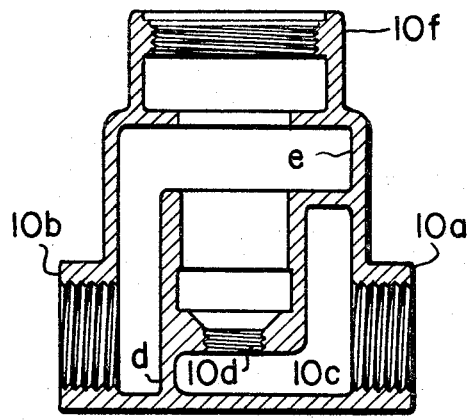
FIGURE 9 is a section in elevation on the scale of FIGURES 2 to 8, inclusive, and taken along the line III–III of FIGURE 6.
Figure 10:
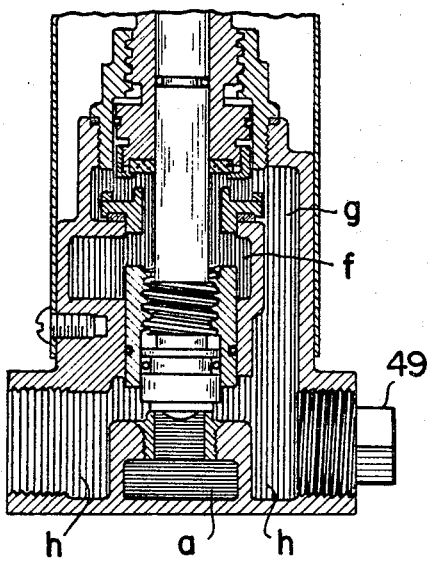
Figure 11:
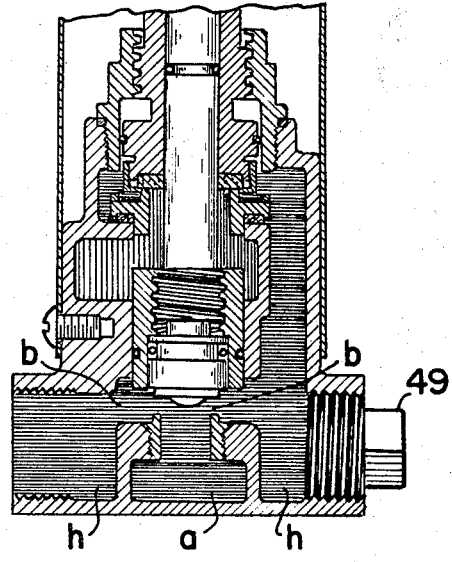

FIGURE 10 is a fragmental vertical section on the scale of FIGURES 2 to 9, taken in the same direction as FIGURE 1, and illustrating the flow of hot water by vertical hatching when the hot water valve means is in its open position; and FIGURE 11 is a view similar to and on the scale of FIGURE 10, showing the flow of cold water by horizontal hatching when the cold water valve means is in its open position; in both FIGURES 10 and 11, a plug has been inserted in what would normally be the tub outlet to illustrate that this outlet or the shower outlet may or may not be used as desired.

In carrying out our invention, we provide a valve device or structure that is adapted to simple mounting, for example, to project outwardly through an opening or hole in a wall 9 above a path tub or in a shower stall. In illustrating our invention, we have shown it applied as a bathroom unit that may be used for supplying water of a desired temperature to either or both a bath tub spout or to a shower spray head. It has a common outlet chamber shown with two outlet portions, one for connection to a conventional shower head and another for connection to a conventional tub spout. If only one of the outlets is to be used, a plug 49 may be inserted in the other (see FIGURES 10 and 11).

The valve device is of a coaxial type and is shown provided with one operating knob 18 for opening, closing and controlling the flow of water from a cold water source and a second operating knob 35 which is provided for opening, closing and controlling flow of water from a hot water source. It will be noted that the knobs 18 and 35 are operatively-positioned in an axially or endwise-aligned, adjacent relation, in such a manner that the hand of the operator or user may be employed to either separately operate one valve means by gripping and turning the knob 18, or operate the other valve means by gripping and turning the knob 35, or simultaneously operate both valve means by gripping both the knobs 18 and 35.

An important feature of our invention involves the employment of one valve operating spindle 15 for, not only operating its associated (cold water) valve means, but for also operatively-positioning and supporting a valve spindle 30 for a second (hot water) valve means. Since both valve means have ports and passageways that lead from their inlet or upstream sides to a common outlet or downstream chamber, it is apparent that any desired temperature may be readily provided by the operator or user, quickly and effectively by employing our device. The concentric cooperative mounting and utilization of a pair of valve means provides an easily operating compound unit that requires only one wall opening for its mounting.

In the illustrated embodiment shown in the drawing, see particularly FIGURE 3, a valve casing or housing casting 10 has a pair of opposed, internally-threaded inlet boss portions 10a and 10b to which suitable cold and hot water supply piping may be conventionally-connected behind the wall or finish 9 of, for example, a shower and tub stall in a bathroom.

A partition wall 10c within the housing 10 defines a cold water inlet chamber a, a centrally-positioned, threaded, cold water inlet bore 10d, a pair of opposed cold water valve outlet ports b, a sleeve-like or cylindrical, centrally-located, guide and mounting wall portion c for receiving a primary positioning or mounting sleeve 25 for the cold water valve, a hot water inlet chamber d (see FIGURE 3), and a hot water valve inlet chamber e. The bottom end of the wall portion c has a partition end portion 10c through which internally-threaded central bore 10d extends. The threaded bore 10d removably-receives and positions a sleeve or collar-like, valve seating element or part 11. As shown particularly in FIGURES 3 and 4, the valve seating element 11 has an externally-threaded cylindrical portion 11a which extends along the bore 10d, and also has an annular-positioning, radially-outwardly-extending, upper flange portion 11b which rests within an upper, outwardly-flared end portion of the bore 10d. The element 11 defines a central inlet port for cold water flow from inlet chamber a to the cold water inlet valve. As shown in FIGURES 1 and 4, its passageway is of somewhat square configuration, as defined by vertical corner slots or slit portions 11d that terminate at their upper ends in an outwardly-flared annular inner wall portion adjacent a seating ring, rim or upper rounded edge 11c. This construction tends to maintaine upward water flow to the cold water valve substantially uniform without swirling motion. As shown, the seating rim or ring 11c is of annular or circular shape and lies adjacent to and surmounts the flange 11b and its rounded upper edge defines a valve seat for the cold water valve means.

A longitudinally-extending (cold water) valve operating spindle or rod 15 has a piston-like valve head portion 15a (see FIGURES 1 and 4) whose lower end is slightly hogged-out to receive a somewhat resilient, flat, valve seating washer 16 which may be of a rubber composition or resin material. The washer 16 is removably-secured in place in the usual manner by a threaded set screw 17 that extends through it into a centrally-threaded bore of the head portion 15a. It will be noted that the washer 16 is adapted to be moved in the direction of the axis of the spindle 15 into and out of closing-off engagement with the end of the seating ring 11c. The piston-like valve head portion 15a is also adapted to slide within a lower end portion of a hollow, primary, positioning oor mounting sleeve part 25.

In order to provide a seal for the slide joint, the spindle 15 has an undercut portion 15b adjacent the head portion 15a to carry a resilient O-ring type of washer 24a thereon. A slide flange portion 15c lies intermediate the undercut portion 15b and a further undercut upper portion 15d. The flange 15c is of the same diameter as and, like the head 15a, is adapted to have a slide-fit within the lower cylindrical portion of the positioning sleeve 25. Opening and closing adjustment of the spindle 15 is effected between a heavy, widely-spaced, male screw thread portion 15e of the spindle 15 and a complementary, female screw thread portion 25e within the mounting sleeve 25. As shown particularly in FIGURES 1 to 4, the sleeve 25 has a series of circumferentially spaced-apart side ports 25f which may consist of four, equally-spaced ports thereabout adjacent its upper end portion, to provide for inflow of hot water from chamber d (see FIGURE 4) into chamber e into an axial or longitudinal chamber f (see FIGURE 10) defined between the spindle 15 and the offset inner periphery of the mounting sleeve 25, for upflow of entering hot water towards a hot water valve seat. The other or hot water valve seat is defined by an upper annular, rounded-edge, seating rim or ring portion 25c.

It will be noted that primary mounting sleeve 25 has an outwardly-projecting positioning flange 25b adjacent the seating ring 25c which is adapted to rest upon an inwardly-projecting flange portion 10e of the housing 10. A flat seating washer 26 is adapted to be positioned between the joint defined by the flange portions 10e and 25b to seal them off with respect to each other, so that no hot water may flow therebetween but must flow upwardly along side chamber f. A flat, somewhat resilient valve washer 32 is adapted to cooperate with the seating rim 25c for movement into and out of a seating position thereon to control the flow of hot water. As shown in FIGURE 1, the valve washer 32 is secured in position within a centrally-inwardly depressed or offset end portion of a secondary valve spindle 30.

Secondary, sleeve-like spindle 30 is provided for operating the hot water or secondary valve means. The spindle 30 has an intermediate portion 30a provided with widely-spaced male threads that cooperate with similar or complementary female threads along an upper end portion 36e of a secondary mounting or positioning sleeve part 36. This, of course, enables the secondary or hot water spindle 30 to be adjusted for moving the valve washer 32 into and out of a seating position with respect to the seating rim 25c.

As shown particularly in FIGURES 1 and 4, the secondary or hot water valve operating spindle 30 has piston or head portion 30b that is adapted to slidably-operate within a lower cylindrical open-end portion of the mounting sleeve 36, and has a groove portion 30c centrally thereof for carrying a resilient annular or O-ring sealing washer 24d. The washer 24d seals-off a slide joint formed between the piston portion 30b and a lower, cylindrical, open-end portion of the secondary mounting sleeve 36. The washer 32 is removably-secured in position within an inner or back end of the secondary spindle 30 by means of an internally-threaded nut 31 which may, as shown in FIGURE 4, be knurled for easy "on" and "off" movement with respect to external threading 30e of the spindle 30.

As shown particularly in FIGURES 1 and 4, the mounting sleeve 36 has a centrally-positioned wrench flat and flange portion 36a which, on its under edge, is adapted to cooperate with a flat sealing washer 37 that is positioned in an annular groove within an upper end of an upper, internally-threaded portion 10f of the housing 10. The mounting sleeve 36 has cooperating external threads 36b which cooperate with the threaded boss portion 10f and the washer 37 to provide a secure, fluid-sealing-off mounted relation of the mounting sleeve 36 with respect to the housing 10.

It will be noted that the secondary mounting sleeve 36 is provided with a group of spaced-apart, elongated port openings 36c adjacent its lower end for bypassing outflow of hot water which is received from the chamber f when the hot water valve is in its "open" position. The hot water then flows from the ports 36c into a side chamber g (see FIGURE 10) formed between the housing 10 and its partition portion 10e and which is open adjacent its lower end to a water outlet or mixing chamber h.

The primary spindle 15 for opening and closing the cold water valve is provided with a central groove portion 15g to receive a resilient O-ring 24b to seal-off its slide or rotational joint within the secondary spindle 30. The spindle 15 has a cylindrical stem portion 15f which is turnably-mounted within the secondary spindle 30 and projects longitudinally or axially outwardly or forwardly thereof. At its extreme upper end, the spindle 15 has a vertically-serrated knob-receiving portion 15h that is provided with an internally-threaded bore to receive a set screw 19. As shown particularly in FIGURES 2 and 3, cold water operating knob 18 is provided with hand-grip ribbing 18b along its outer periphery and with a centrally-inwardly-offset or depressed, wall portion 18c (see FIGURES 1 and 4) which terminates in an inwardly-offset mounting end wall portion 18d. The portions 18c and 18d define a cup-like shape. The set screw 19 extends through the portion 18d to removably-secure mounting boss 18e on the receiving portion 15h of the spindle. The serrations provide a secure non-turning mounted relation between the knob 18 and the spindle 15.

The secondary spindle 30 which operates or opens and closes and controls the hot water valve, is provided with grip ribbing portions 30b along its outer periphery, and has a centrally-upwardly-projecting open-end spacer sleeve portion 35c which is adapted to extend within the hollow back end portion of the knob 18 to provide a vertical continuation into the knob 18. The spacer sleeve portion 35c projects centrally within the knob 35 and is provided with a bottom wall portion 35d. The portions 35c and 35d also define a cup-like shape. The bottom wall portion 35d, in turn, terminates in a sleeve-like boss or knob-mounting portion 35e. The mounting boss portion 35e is adapted to be secured on the upper end portion 30h of the secondary spindle 30 which is vertically-serrated (see FIGURE 4) to form a tight, non-rotating fit with the spindle. The extreme upper end of the portion 30h of the secondary spindle 30 has external or male threads for receiving an internally-threaded, cooperating, retaining nut 30g.

As shown particularly in FIGURE 1 of the drawings, the device of our invention may be easily mounted to extend through a wall portion 19 of a shower stall or the like, by first removing the operating knobs 18 and 35 and sliding it through a hole cut therein. The housing 10 may be provided with a finish or cover sleeve 40 of brass, nickel, stainless steel or the like. The sleeve 40 extends through the wall 9, about forwardly or outwardly extending operating parts of the device, and within the open back end portion of the secondary or hot water valve operating knob 35. The cover sleeve 40 may be removably-secured in position, as shown particularly in FIGURE 1, by one or more set screws 41 which are adapted to extend into threaded holes in a thickened portion of the housing 10.

To complete the finish mounting of the device, we have provided a cover or finish cap 46 which has a backwardly-projecting, outer end flange portion 46a that is adapted to have an abutting or flush mounting against the wall 9. The cap 46 also has a backwardly or inwardly-projecting, central, inner flange portion 46b which has a thread edge to cooperate with a backwardly or inwardly-converging threaded portion 45b of a resin or somewhat resilient mounting collar 45. The mounting collar 45 has a frictional slide fit on the finish sleeve 40 and is free to move therealong when its threads are out of engagement with the cover 46. However, due to the frusto-conical shape of its threaded portion 45b, the collar 45 will function to tightly frictionally hold itself, and the cap 46 in any desired positioned relation along the sleeve 40 when it is tightened or screwed-down within the cover 46, as accomplished by the engagement of the edge portion of the inner flange 46b with the externally-threaded portion 45b.

The collar 45 has a knurled hand-grip portion 45a in order that it may be turned into and out of a locked position without requiring the use of a tool.

As shown particularly in FIGURES 2 and 3, the knob 18 may be provided with cold water C designations 18a on its outer surface and the hot water knob 35 may have hot water H designations 35a thereon. It will also be noted that the overlapping longitudinal or axial extension of the sleeve 40 and of the portion 35c of the knob 35 provide a closed-off side relation along the outer extension of the device.

It will also be apparent from the coaxial type of mounting of these figures that the hand of the user or operator can either individually operate the knob 18 or the knob 35 or can simultaneously operate them together in sequence, to open and close the hot water valves separately, or to open and close them simultaneously.

As shown particularly in FIGURE 4, inner wall portion 18c of the cold water knob 18 may, if desired, be closed-off by an end closure cap 20. This cap may be of polished stainless steel or other suitable finish metal. It has a pressure fit within the vertical sleeve wall portion 18c, as accomplished by spaced-apart spring-like clamping prongs 20a. If desired, and as shown, the finish closure cap 20 which hides the set screw 19 may be provided with "off" and "on" directional arrows.

Although we have shown a preferred embodiment of our invention, it will be apparent that various modifications and changes may be made without departing from its spirit and scope and that it may be applied to other fluid control applications or fields.

What we claim is:

1. A dual valve device for controlling fluid flow between a pair of fluid sources and an outlet which comprises, a housing having portions defining a first inlet chamber for receiving fluid from one of the sources, a second inlet chamber for receiving fluid from the other of the sources, and a common fluid outlet chamber; a first valve means operatively-positioned in said housing for controlling fluid flow between the first inlet chamber and the common outlet chamber, a second valve means operatively-positioned in a coaxial relation with respect to the first valve means, each of said valve means having an operating spindle projecting outwardly from said housing, a first mounting bushing carried by said housing for rotatably-mounting the spindle of said first valve means to control its operation, the spindle for said second valve means being rotatably-positioned coaxially on the spindle of said first valve means, a second mounting bushing carried by said housing for rotatably-mounting the spindle of said second valve means to control its operation, a first valve inlet extending from said first inlet chamber to said first valve means, a first valve outlet between an inner portion of said housing and said first mounting bushing and connected to the common outlet chamber for receiving fluid from said first valve inlet when said first valve means is in an open position and for delivering fluid to the common outlet chamber, a second valve inlet defined between the spindle of said first valve means and said first mounting bushing for receiving fluid from the second inlet chamber and supplying it to said second valve means, a second valve outlet defined between said second mounting bushing and a portion of said housing and connected to the common outlet chamber for receiving fluid from said second valve inlet when said second valve means is in an open position and for delivering the fluid to the common outlet chamber, and operating knobs mounted on each of said spindles in an aligned adjacent relation for actuating them and their respective valve means to control fluid flow between each of the inlet chambers and the common outlet chamber.

2. In a valve device as defined in claim 1, each of said valve means having a valve head at its inner end within said housing, said first valve inlet being defined by a sleeve having a seating ring positioned in cooperative alignment with the valve head of said first valve means, and said mounting bushing for said first valve means having a seating flange positioned in cooperative alignment with the valve head of said second valve means.

3. A valve device as defined in claim 1 wherein, said housing has a pair of threaded inlet bosses adjacent a back end thereof extending from opposite sides thereof on a common transverse plane in an opposed relation, one of which is connected to the first inlet chamber and the other of which is connected to the second inlet chamber, and said housing has a pair of threaded outlet bosses extending substantially at right angles to and on the same transverse plane as said inlet bosses and connected to the common outlet chamber for supplying fluid from the common outlet chamber to a pair of fluid-receiving means.

4. A valve device as defined in claim 1 wherein, one of said spindles projects outwardly from within the other of said spindles, both of said operating knobs are of hollow construction and are open backwardly along their respective spindles, and an inner one of said operating knobs has a sleeve portion projecting forwardly thereof across the spacing between it and an outer one of said operating knobs and within said outer operating knob.

5. A valve device as defined in claim 1 wherein, a finish sleeve is positioned about and is removably-secured to project forwardly of said housing, said operating knobs are of hollow construction and are open backwardly thereof towards said finish sleeve, one of said spindles projects outwardly from within the other of said spindles and carries an outer one of said knobs and the other of said spindles carries an inner one of said knobs, said finish sleeve extends forwardly from said housing outwardly along said spindles and within the inner one of said knobs, and the inner one of said knobs has a sleeve portion projecting forwardly thereof and within the outer one of said knobs.

6. A valve device as defined in claim 1 wherein, an enclosing finish sleeve projects forwardly-outwardly from said housing and thereabout as well as about said spindles, resin collar is slidably-positioned for longitudinal sliding movement along said finish sleeve, a wall closure cap is loosely-positioned about said finish sleeve and has an inner thread edge portion, said collar has a backwardly-projecting and converging threaded wall portion to threadably-cooperate with the inner thread edge of said cap member, and the threaded wall portion of said collar is adapted to be tightened-down between the threaded edge of said cap and an outer wall of said finish sleeve to exert a resilient position-retaining force action between said cap and said finish sleeve.

References Cited

UNITED STATES PATENTS

| 682,453 | 9/1901 | Bunting | 137—637.2 X |
| 1,508,021 | 9/1924 | Lakso | 137—637.2 |
| 1,807,081 | 5/1931 | Bletcher | 137—637.2 X |
| 3,099,996 | 8/1963 | Symmons | 137—637.2 X |
| 3,331,386 | 7/1967 | Politz | 137—360 X |

FOREIGN PATENTS

| 539,659 | 9/1941 | Great Britain. |
| 581,543 | 8/1959 | Canada. |

CLARENCE R. GORDON, *Primary Examiner.*

UNITED STATES PATENT OFFICE
CERTIFICATE OF CORRECTION

Patent No. 3,411,541　　　　　　　　　　　　　　　　November 19, 1968

Clarence B. Hindman et al.

It is certified that error appears in the above identified patent and that said Letters Patent are hereby corrected as shown below:

Column 2, line 5, "valcve" should read -- valve --; line 49, "path" should read -- bath --. Column 3, line 49, "maintaine" should read -- maintain --; line 68, "oor" should read -- or --. Column 5, line 45, "19" should read -- 9 --.

Signed and sealed this 3rd day of March 1970.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents